(12) United States Patent
Abeles

(10) Patent No.: US 10,660,264 B2
(45) Date of Patent: May 26, 2020

(54) APPARATUS AND METHOD FOR ESTABLISHING AND GROWING VEGETATION IN ARID ENVIRONMENTS

(71) Applicant: Gary E Abeles, Verona, NJ (US)

(72) Inventor: Gary E Abeles, Verona, NJ (US)

( * ) Notice: Subject to any disclaimer, the term of this patent is extended or adjusted under 35 U.S.C. 154(b) by 400 days.

(21) Appl. No.: 15/476,017

(22) Filed: Mar. 31, 2017

(65) Prior Publication Data

US 2017/0202134 A1    Jul. 20, 2017

Related U.S. Application Data

(63) Continuation-in-part of application No. 14/203,872, filed on Mar. 11, 2014, now Pat. No. 9,629,341.

(60) Provisional application No. 61/786,721, filed on Mar. 15, 2013.

(51) Int. Cl.
| | |
|---|---|
| *A01G 20/20* | (2018.01) |
| *A01G 13/02* | (2006.01) |
| *A01C 14/00* | (2006.01) |
| *A01C 1/04* | (2006.01) |
| *A01C 21/00* | (2006.01) |
| *A01G 24/35* | (2018.01) |

(52) U.S. Cl.
CPC .............. *A01C 14/00* (2013.01); *A01C 1/044* (2013.01); *A01G 13/0206* (2013.01); *A01G 20/20* (2018.02); *A01C 21/00* (2013.01); *A01G 24/35* (2018.02); *Y02A 40/294* (2018.01)

(58) Field of Classification Search
CPC .......... A01C 14/00; A01C 1/044; A01G 13/04
See application file for complete search history.

(56) References Cited

U.S. PATENT DOCUMENTS

| | | | |
|---|---|---|---|
| 3,698,131 A * | 10/1972 | Kesinger | A01G 9/242 47/29.1 |
| 4,353,946 A | 10/1982 | Bowers | |
| 5,338,131 A | 8/1994 | Bestmann | |
| 5,598,661 A * | 2/1997 | Eiderman | A01G 9/247 47/48.5 |
| 5,641,244 A | 6/1997 | Bestmann | |

(Continued)

FOREIGN PATENT DOCUMENTS

DE    2709562 A *  9/1977 ............. A01G 13/02

OTHER PUBLICATIONS

International Preliminary Report on Patentability for Appl No. PCT/US2017/025394 dated Oct. 1, 2019, 11 pages.

*Primary Examiner* — Monica L Williams
(74) *Attorney, Agent, or Firm* — Maine Cernota & Rardin

(57) ABSTRACT

A method and apparatus for cultivating vegetation at an arid location includes rooting immature vegetation in a mat combined with a super absorbent polymer ("SAP") and, in embodiments, fertilizer, sand, and/or soil; placing the mat at the arid location; and covering the mat with a perforated, transparent or semi-transparent cover. Most or all of the apparatus can be biodegradable or removable, and the sand or soil can be similar to indigenous sand or soil. A water barrier can be placed below the mat. The cover can be placed on or suspended above the mat. SAP, seeds, and/or additional water barriers can be placed between mats in a stack. The opacity of the cover can be increased to emulate shade from natural vegetation. A water distribution system can be included for continued support of the vegetation, and can include a water reservoir and/or at least one solar still.

34 Claims, 16 Drawing Sheets

(56) References Cited

U.S. PATENT DOCUMENTS

| | | | |
|---|---|---|---|
| 5,724,766 A * | 3/1998 | Behrens | E04D 11/002 47/56 |
| 6,293,045 B1 | 9/2001 | Morgan | |
| 8,024,890 B2 | 9/2011 | Bertin | |
| 8,256,160 B2 * | 9/2012 | Rubin | C05F 5/002 47/58.1 SC |
| 2005/0235558 A1 | 10/2005 | Carrillo | |
| 2006/0191194 A1 | 8/2006 | Abitz et al. | |
| 2006/0291963 A1 | 12/2006 | Theisen | |
| 2007/0163172 A1 * | 7/2007 | Savich | A01C 1/044 47/56 |
| 2009/0293350 A1 * | 12/2009 | Kania | A01G 9/023 47/29.1 |
| 2011/0308152 A1 | 12/2011 | Harlet | |
| 2013/0192131 A1 * | 8/2013 | Abahusayn | A01G 9/14 47/17 |
| 2015/0201565 A1 * | 7/2015 | Toye | A01G 13/0206 47/29.1 |
| 2016/0262320 A1 | 9/2016 | Ruys et al. | |

\* cited by examiner

APPARATUS AND METHOD FOR ESTABLISHING AND GROWING VEGETATION IN ARID ENVIRONMENTS

RELATED APPLICATIONS

This application is a continuation in part of U.S. application Ser. No. 14/203,872, filed Mar. 11, 2014. application Ser. No. 14/203,872 claims the benefit of U.S. provisional application 61/786,721, filed Mar. 15, 2013. Both of these applications are herein incorporated by reference in their entirety for all purposes.

FIELD OF THE INVENTION

The invention relates to methods for growing vegetation, and more specifically to apparatus and methods for establishing and growing vegetation in arid environments.

BACKGROUND OF THE INVENTION

While arid environments such as deserts and semi-deserts are often somewhat inhospitable to vegetation, nevertheless there are varieties of succulents and other vegetation that can survive and even thrive unassisted in all but the harshest environments. Under certain circumstances, it can be desirable to introduce new vegetation into an arid environment so as to stabilize the underlying sand or soil, reduce the prevalence of blown dust and sand, beautify the landscape, and/or re-establish an ecosystem after it has been damaged by industrial activity or by a natural disaster. Unfortunately, the initial introduction of such vegetation can be difficult and time consuming, due to the poor water retention of the sand or soil, the slow growth that is typical of desert and semi-desert vegetation, and the fragility of immature vegetation until it has established a sufficient root system to allow it to obtain water and to resist wind and excess sun exposure.

Furthermore, it may be desirable to grow vegetation such as edible food plants in arid environments while minimizing the cost and labor associated with initiating and maintaining the vegetation.

Of course, scarcity of water is the feature that more or less defines an arid environment. When an arid location is devoid of mature vegetation this scarcity of water is typically multiplied, because high temperatures and the prevalence of unshaded sunshine can tend to quickly evaporate any moisture that is present. In addition, the ground in an arid environment is often very sandy, such that any precipitation that falls as rain or forms on the surface as dew tends to be absorbed quickly into the sand, wherein it settles to a depth that is beyond reach of the root systems of vegetation.

Once vegetation is well established in an arid location, it can play a significant autogenic role in improving the environment by blocking direct sunlight and by capturing and retaining available moisture before it is absorbed or evaporated. Furthermore, over time, decomposing vegetation can reduce the porosity of the soil and thereby further improve the retention of water near the surface. However, even newly-planted vegetation that is adapted to arid environments often has a very difficult time surviving until it has matured. And, of course, food plants and other vegetation that is not adapted to arid environments requires continued support when cultivated in an arid environment.

Existing methods for introducing and growing vegetation in arid ecosystems are typically expensive and risky, and the benefits are often short-lived. Current approaches to arid ecosystem rehabilitation are extensions of traditional agronomic technologies developed under more hospitable climates, and require intensive tending and excessive use of irrigation to have any chance of success. Often, such an expenditure of time and resources is not practical, and serves as a barrier to the restoration and/or improvement of arid environments, and to farming and other cultivation of non-arid vegetation in arid environments.

Furthermore, traditional approaches to introducing such vegetation typically require construction and use of extensive irrigation systems and other structures and maintenance equipment that are not natural to the environment. Even if they are subsequently removed, the environmental damage that is left behind can remain for an extended period of time.

What is needed, therefore, is an apparatus and method for introducing and growing vegetation in arid environments while minimizing both initial and long term maintenance requirements, including water usage.

SUMMARY OF THE INVENTION

The present invention is an apparatus and method for introducing and growing vegetation in arid environments while minimizing maintenance requirements, including water usage. One general aspect of the invention is an apparatus and method for introducing new vegetation that is compatible with arid environments into an arid location with little or no initial maintenance period, and without introducing permanent, artificial structures into the environment. A second general aspect of the invention is an apparatus and method for cultivating non-arid food plants and/or other vegetation in an arid environment while minimizing both initial and long term maintenance requirements, including water usage.

According to the disclosed invention, a mat is prepared and is impregnated with a "super absorbent polymer" or "SAP." In the first general aspect, the mat is biodegradable, and in some of these embodiments the mat includes coir. In various embodiments of the first general aspect the SAP is biodegradable, being for example a cellulose-based or starch-based polymer.

In some embodiments, fertilizer is included with the mat. And in various embodiments at least one of sand and soil is included with the mat. In some embodiments of the first general aspect where sand or soil is included, the included sand or soil has a composition that is similar to sand or soil that is indigenous to the arid location.

Vegetation is allowed to sprout and/or take root in the mat. In some embodiments, the vegetation is initially sprouted and rooted under controlled conditions remote from the arid location, and then the mat is transferred to the arid location. In other embodiments, the vegetation sprouts and/or roots after the mat is placed at the arid location.

Once the mat is placed at the arid location, it is covered by a perforated cover sheet that is transparent or semi-transparent. The cover sheet serves as a physical barrier to water vapor beneath the cover that is formed by evaporating dew and by any moisture that is evaporated from the ground or mat, so that the water vapor tends to condense on the under-side of the cover sheet, and to drip back onto the mat, where it is absorbed by the SAP.

In some embodiments the cover is placed directly onto the mat, whereby the growing vegetation lifts the cover, and in some embodiments eventually breaks through the cover. In other embodiments, the cover is supported above the mat by a support structure, such as a plurality of stakes. The stakes or other support structure can be ventilated around its edges so as to avoid excess "greenhouse" heating of the vegetation. The perforations can be made in locations where depressions in the cover sheet will naturally form between the stakes or other supports, so that any rain that falls onto the cover sheet will drain through the perforations and be absorbed by the SAP in the underlying mat. In embodiments of the first general aspect, the cover sheet is made of a biodegradable cellulosic material. Similarly, if included, the stakes or other support structure of the cover sheet can be made of a biodegradable material such as coir or cellulose.

For use in areas of intense sunlight, the opacity of the cover sheet can be increased by printing a pattern onto the sheet, adding a dye to the sheet material, or by any other means known in the art, so as to reduce the intensity of light reaching the mat.

Embodiments further include a water barrier placed below the mat which prevents any water that is not retained by the mat and SAP from reaching the underlying soil or sand. This feature can be especially helpful in sandy locations where any moisture that reaches the underlying sand will be quickly absorbed and lost. The water barrier can be a plastic sheet. In embodiments of the first general aspect, the water barrier can be cellulosic or otherwise biodegradable.

Some embodiments include a plurality of mats stacked on top of each other, with SAP and/or seeds located in between. Seeds germinating between mats thereby experience an environment similar to seeds that are planted below ground, which do not encounter sunlight until they have sprouted and grown upward through the soil. In some of these embodiments, further layers of water barrier sheets and/or perforated sheets are also placed between the mats.

A significant feature of the first general aspect of the invention is that most or all of the apparatus is biodegradable or removable, so that there is no lasting effect on the natural appearance of the environment after the mat has biodegraded and the vegetation is fully established. Depending on the embodiment, elements of the fertilizer and/or the SAP may not degrade as quickly as the mat. However, any SAP and/or fertilizer that does not biodegrade will mix easily with the underlying soil or sand, such that they enhance the quality of the soil or sand and do not affect the appearance of the landscape. If sand or soil is included with the mat, it is selected in some embodiments to be similar to sand or soil that naturally occurs at the arid location, so that the sand or soil does not change the appearance or properties of the location.

In the second general aspect of the invention, vegetation is cultivated that requires continued watering, shade, and/or other support, such that the mat(s), cover sheet(s) and other components are typically not biodegradable. Some of these embodiments further include an irrigation system that can deliver water on an on-going basis to the mat (or mats) from an external water reservoir and/or one or more "solar stills" that extract water from the underlying soil using solar heat. In some of these embodiments, the mat (or mats) is/are made from a material that naturally wicks the provided water throughout the mat, ensuring that the SAP and the vegetation is uniformly wetted.

One general aspect of the present invention is a method for cultivating vegetation at an arid location. The method includes providing a mat, providing a super-absorbent polymer ("SAP") cooperative with the mat, selecting a variety of vegetation to be grown at the arid location, causing immature plants of the selected variety to take root in the mat, placing the mat with rooted vegetation at the arid location, and covering the mat with a perforated, transparent or semi-transparent cover.

Embodiments further include incorporating fertilizer into the mat. Any of the above embodiments can further comprise including sand or soil with the mat. And in some of these embodiments, the sand or soil is similar to sand or soil that is present at the arid location.

In any of the above embodiments, the steps of placing the mat at the arid location and covering the mat with the transparent or semi-transparent cover can occur before the step of causing the immature plants to take root in the mat, or the steps of placing the mat at the arid location and covering the mat with the transparent or semi-transparent cover can occur after the step of causing the immature plants to take root in the mat.

In any of the above embodiments, covering the mat with the transparent or semi-transparent cover can include placing the cover directly on the mat.

In any of the above embodiments, the cover can be biodegradable.

Any of the above embodiments can further include removing the cover from the arid location after the vegetation has become established at the arid location.

In any of the above embodiments, covering the mat with the transparent or semi-transparent cover can include suspending the cover above the mat using a support structure. In some of these embodiments, the support structure is biodegradable. And any of these embodiments can further include removing the support structure from the arid location after the vegetation has become established at the arid location.

Any of the above embodiments can further include placing a water barrier at the arid location below the mat. And in some of these embodiments the water barrier is biodegradable.

Any of the above embodiments can further include providing a water distribution system cooperative with the mat, and providing water to the vegetation during the cultivation thereof via the water distribution system. Some of these embodiments further include providing a water reservoir and/or at least one solar still. And some of these embodiments further include placing waste vegetation in the solar still so that moisture is extracted from the waste vegetation and distributed to the vegetation that is rooted in the mat.

A second general aspect of the present invention is an apparatus for cultivating vegetation at an arid location. The apparatus includes a mat, a super-absorbent polymer ("SAP") cooperative with the mat, seeds or immature vegetation incorporated or rooted in the mat, and a perforated, transparent or semi-transparent cover configured for covering the mat.

In embodiments, the mat is biodegradable. And in some of these embodiments, the biodegradable mat includes coir.

In any of the above embodiments, the vegetation can be compatible with the arid location.

Any of the above embodiments can further comprise fertilizer included in the mat.

Any of the above embodiments can further comprise at least one of sand and soil included with the mat. And in some of these embodiments the included sand or soil is similar in appearance to sand or soil that is indigenous to the arid location.

In any of the above embodiments, the SAP can be biodegradable. And in some of these embodiments the SAP is a cellulose-based or starch-based polymer.

In any of the above embodiments, the cover can be biodegradable.

Any of the above embodiments can further comprise a support structure configured for suspending the cover above the mat. In some of these embodiments, the support structure is biodegradable. In any of these embodiments, the support structure can provide for adjustment of the height at which the cover is suspended above the mat. In any of these embodiments, the support structure can include a plurality of stakes that support the cover at spaced-apart support locations below the cover. And in some of these embodiments the cover is perforated at locations that are spaced apart from the support locations of the stakes.

In any of the above embodiments, the mat can be included in a stack of mats. And some of these embodiments further include a water barrier included between a pair of adjacent mats in the stack of mats.

And any of the above embodiments can further comprise comprising a water distribution system cooperative with the mat. Some of these embodiments include a water reservoir and/or at least one solar still.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 9 is an exploded view of an embodiment that includes a plurality of stacked mats with SAP, seeds, and a water barrier in between;

DETAILED DESCRIPTION

The present invention is an apparatus and method for introducing and growing vegetation in arid environments while minimizing maintenance requirements, including water usage. One general aspect of the invention is an apparatus and method for introducing new vegetation that is compatible with arid environments into an arid location with little or no initial maintenance period, and without introducing permanent, artificial structures into the environment. A second general aspect of the invention is an apparatus and method for cultivating non-arid food plants and/or other vegetation in an arid environment while minimizing both initial and long term maintenance requirements, including water usage.

Figure 1:
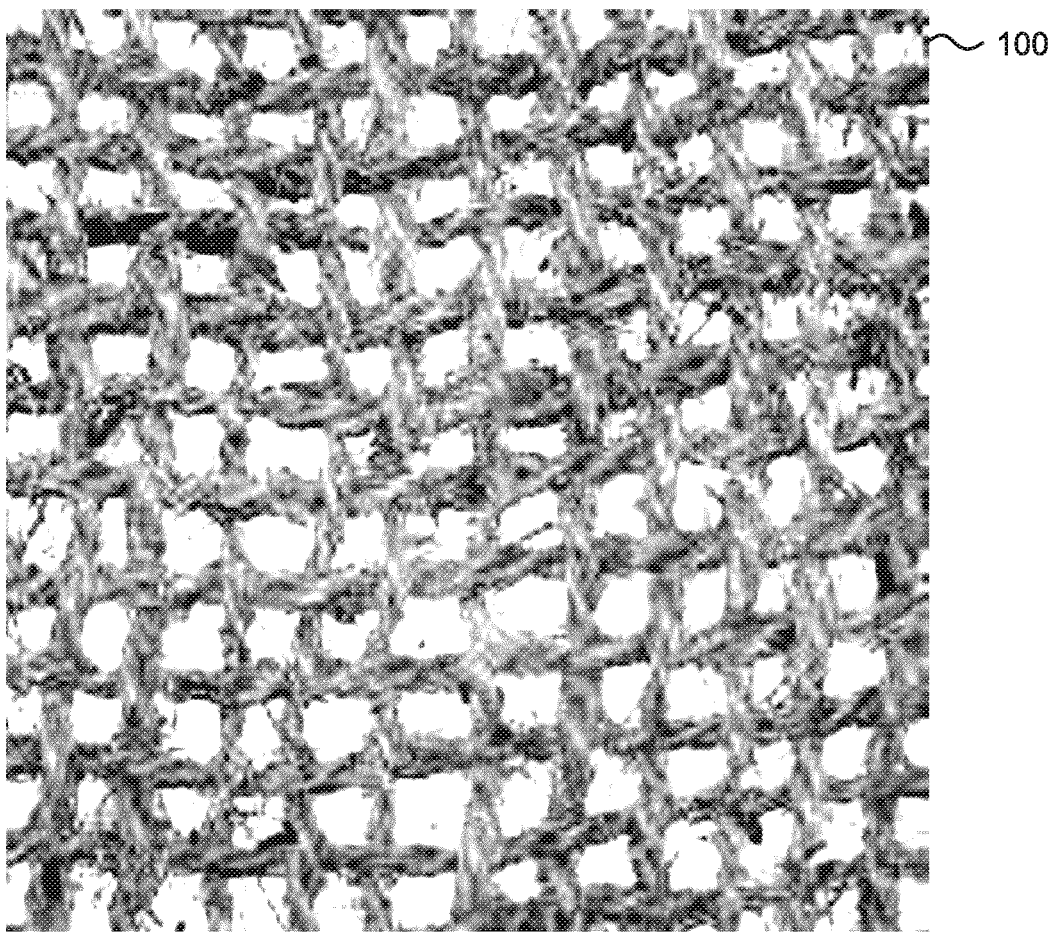
FIG. 1 is a top view of a coir fiber mat used in an embodiment of the present invention.

With reference to FIG. 1, a mat 100 is prepared and is impregnated with a "super absorbent polymer" or "SAP." In the first general aspect, the mat 100 is biodegradable, and in some of these embodiments the mat 100 includes coir. In various embodiments of the first general aspect the SAP is biodegradable, being for example a cellulose-based or starch-based polymer.

In some embodiments, fertilizer is included with the mat 100. And in various embodiments, at least one of sand and soil is included with the mat 100. In some embodiments of the first general aspect where sand or soil is included, the included sand or soil has a composition that is similar to sand or soil that is indigenous to the arid location.

Figure 2:
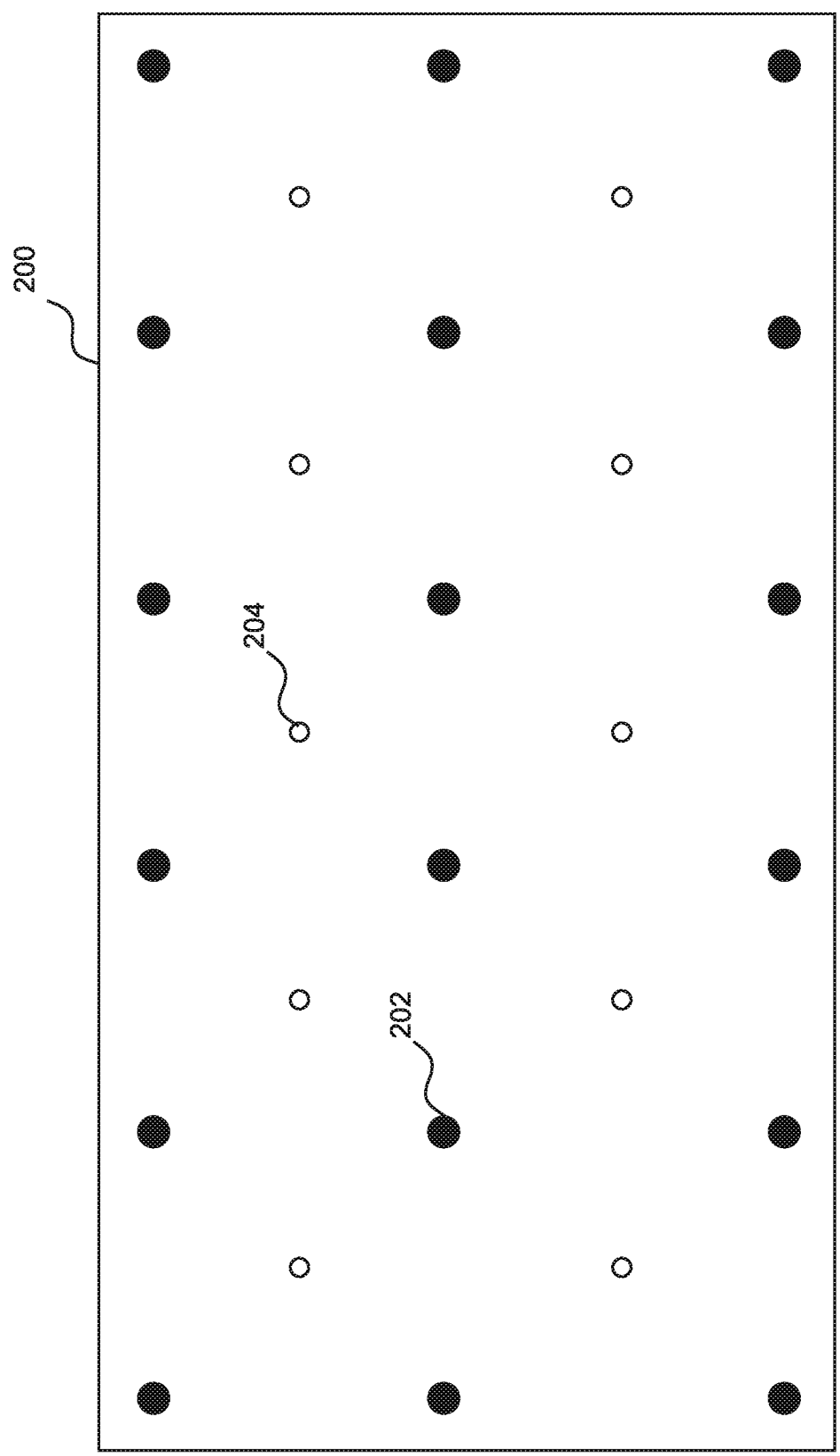
FIG. 2 is a top view of a perforated, transparent cover in an embodiment of the present invention

With reference to FIG. 2, a transparent or semi-transparent cover sheet 200 is prepared. In embodiments, a supporting structure such as a set of support stakes 202 is configured to suspend the sheet 200 above the mat and vegetation 200. Perforations 204 are made in the cover sheet 200, so that any rain that falls onto the cover sheet will drain through the perforations and be absorbed by the SAP in the underlying mat. In the embodiment of FIG. 2, the perforations 204 are located between the stakes 202, in locations where depressions in the cover 200 sheet will naturally form.

In some embodiments of the first general aspect, the cover sheet 200 and supporting structure 202 are biodegradable. For example, in embodiments the cover sheet 200 is made of a biodegradable cellulosic material, and the stakes 202 are made from coir or from a cellulosic substance.

Figure 3:
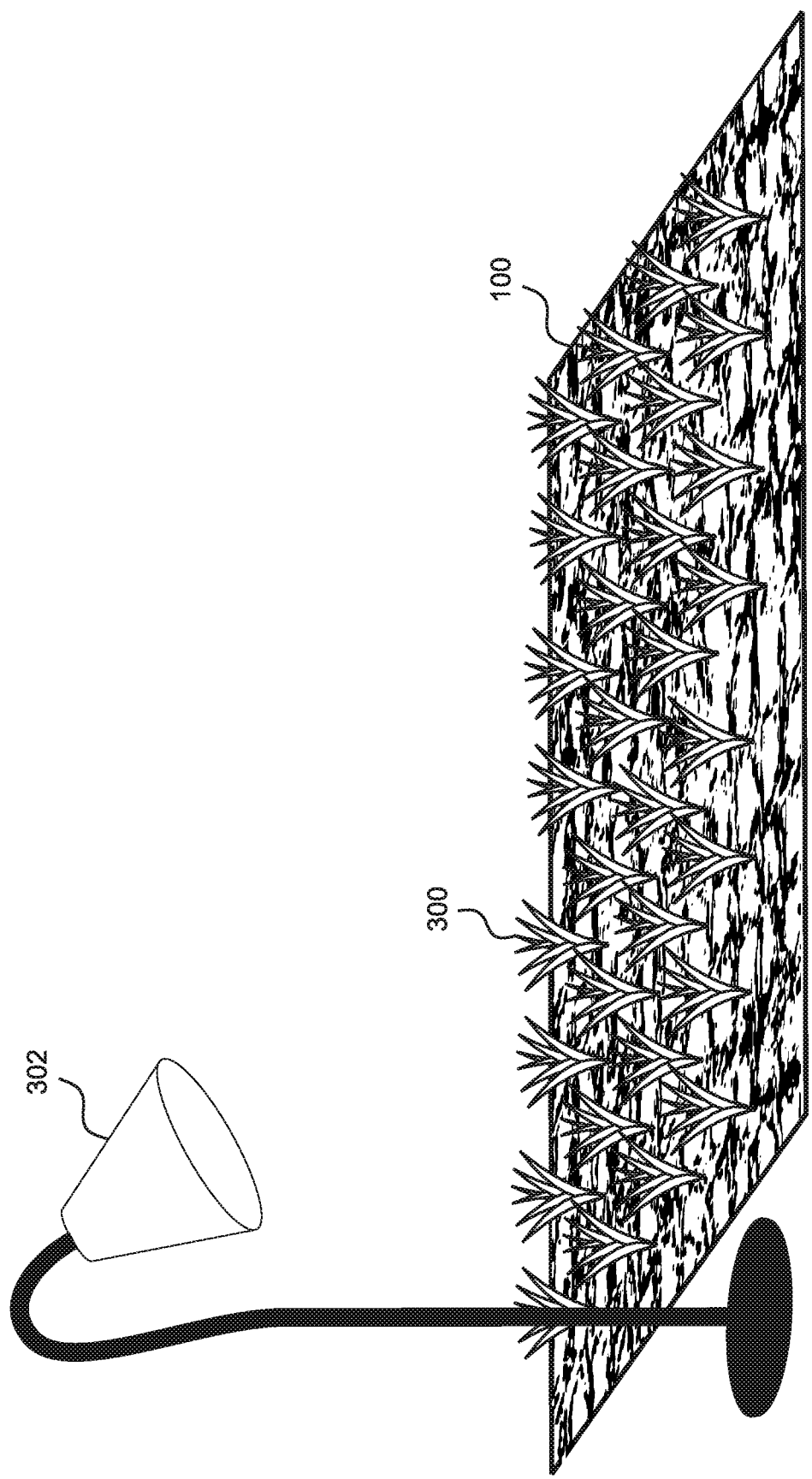
FIG. 3 is perspective view of the mat of FIG. 1 having been impregnated with SAP (not visible) and having vegetation that is compatible with an arid location sprouted and rooted therein under controlled conditions.
Figure 4:
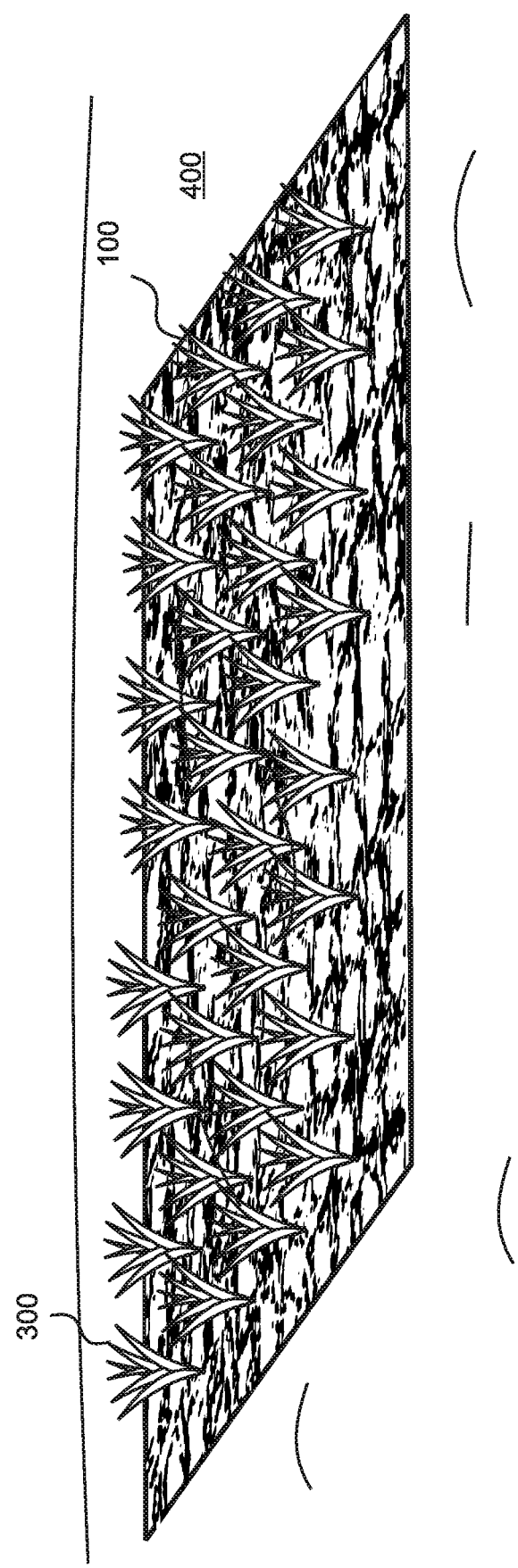
FIG. 4 is a perspective view of the mat and vegetation of FIG. 3, showing them in place on an arid location.

At least one selected variety of vegetation 300 is allowed to sprout and/or take root in the mat. With reference to FIG. 3, in some embodiments the vegetation 300 is allowed to sprout and take root in the mat 100 under controlled conditions, such as an indoor location with controlled temperature, humidity, and lighting 302. With reference to FIG. 4, once the vegetation 300 has taken root in the mat, the mat 100 with SAP and sprouted vegetation 300 (and in embodiments fertilizer, sand, and/or soil) is transferred to the arid location 400.

Figure 5:
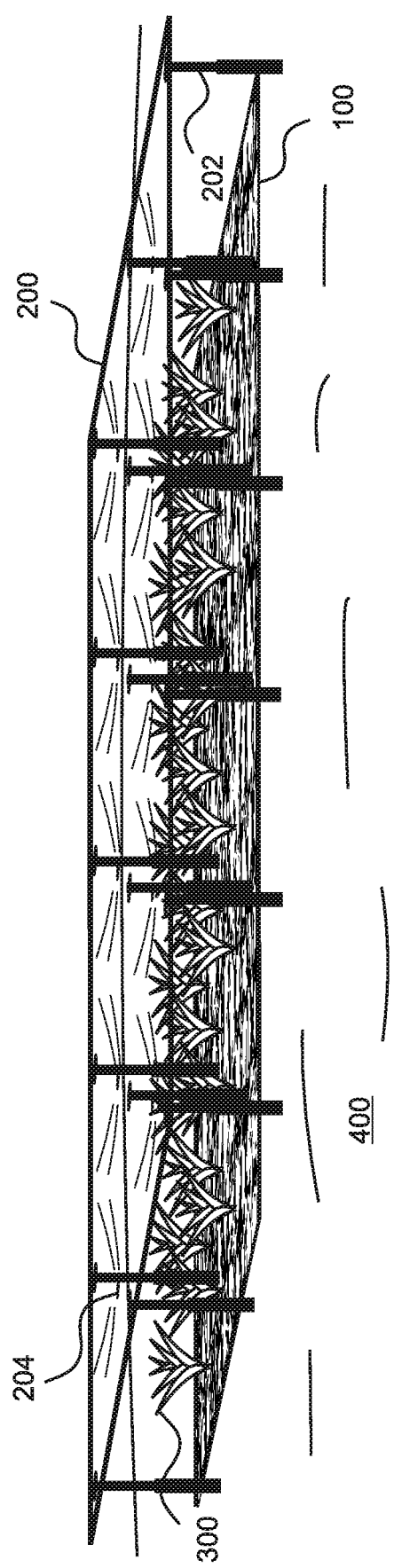
FIG. 5 is a perspective view of the mat and vegetation of FIG. 4 covered by the cover of FIG. 2.

With reference to FIG. 5, the combined mat, SAP, and vegetation 200 are then covered by the perforated, biodegradable cover sheet 200. The cover sheet 200 serves as a physical barrier to water vapor that is formed below the sheet by evaporation of dew and of any other moisture from the ground 400. As a result, the water vapor tends to condense on the under-side of the cover sheet 200, and to drip back onto the mat 100, where it is absorbed by the SAP.

In the embodiment of FIG. 5, the cover 200 is supported by stakes 202 that are adjustable in height due to a threaded, telescoping configuration. Similar embodiments use other support structures that are either fixed or adjustable in height. In the embodiment of FIG. 5, the cover 200 is elevated by the stakes 202 around its perimeter, such that the region below the cover 200 is ventilated, thereby avoiding excess "greenhouse" heating of the vegetation.

In some embodiments the cover 200 is transparent, as shown in FIG. 5. In similar embodiments, for example where there is excessive direct sunshine, the opacity of the cover sheet 200 is increased by printing a pattern onto the sheet 200, adding a dye to the sheet material, or by any other means known in the art, so as to reduce the intensity of light reaching the mat and vegetation 300, thereby simulating the shade that would be provided by mature vegetation in an established ecosystem.

Figure 6:
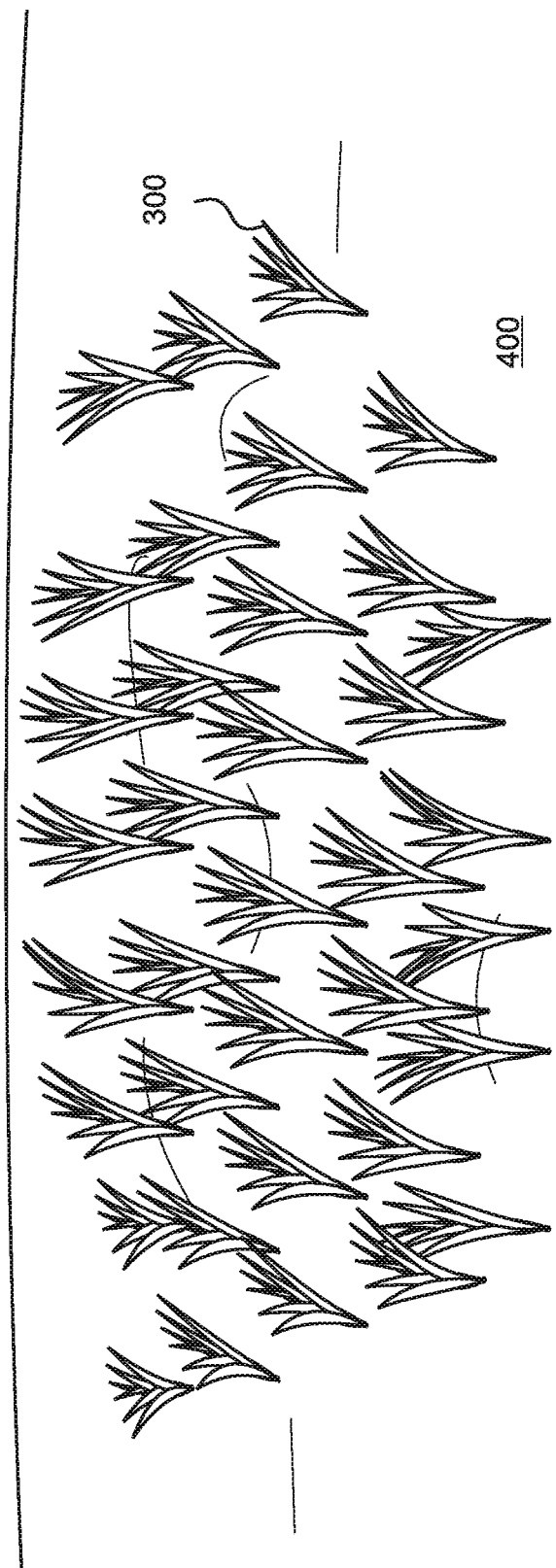
FIG. 6 is a perspective view of the arid location of FIG. 5 shown after the vegetation has been established in the underlying sand and soil, the mat has biodegraded, and the cover and support structure have been removed.

With reference to FIG. 6, in embodiments of the first general aspect of the invention most or all of the apparatus is biodegradable or removable, so that there is no lasting effect on the natural appearance of the environment after the mat 100 has biodegraded and the vegetation has matured. In some of these embodiments, the cover sheet 200 and stakes 202 are removed after the vegetation 300 is well established, while in other embodiments the cover sheet 200 and/or stakes 202 are biodegradable, and need not be removed. Elements of the SAP and fertilizer (in some embodiments) may not degrade as quickly as the mat 100. However, any SAP and/or fertilizer that is not biodegraded will mix easily with the underlying soil or sand 400, such that they enhance the quality of the soil or sand 400 and will not affect the appearance of the landscape. If sand or soil is included with the mat 100, it is selected in embodiments to be similar to sand or soil that naturally occurs at the arid location 400, so that the sand or soil does not change the appearance or properties of the location 400.

Figure 7:
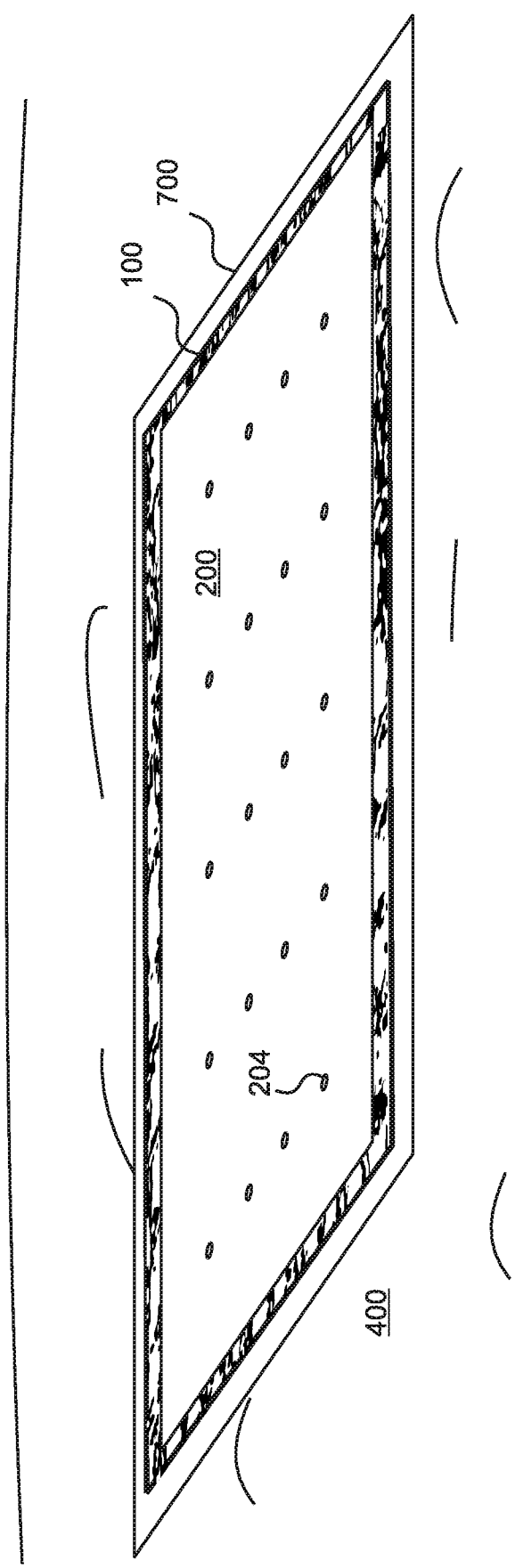
FIG. 7 is a perspective view of an embodiment that includes a water barrier beneath the mat, and wherein the transparent cover is frangible and is placed directly onto the mat.
Figure 8:
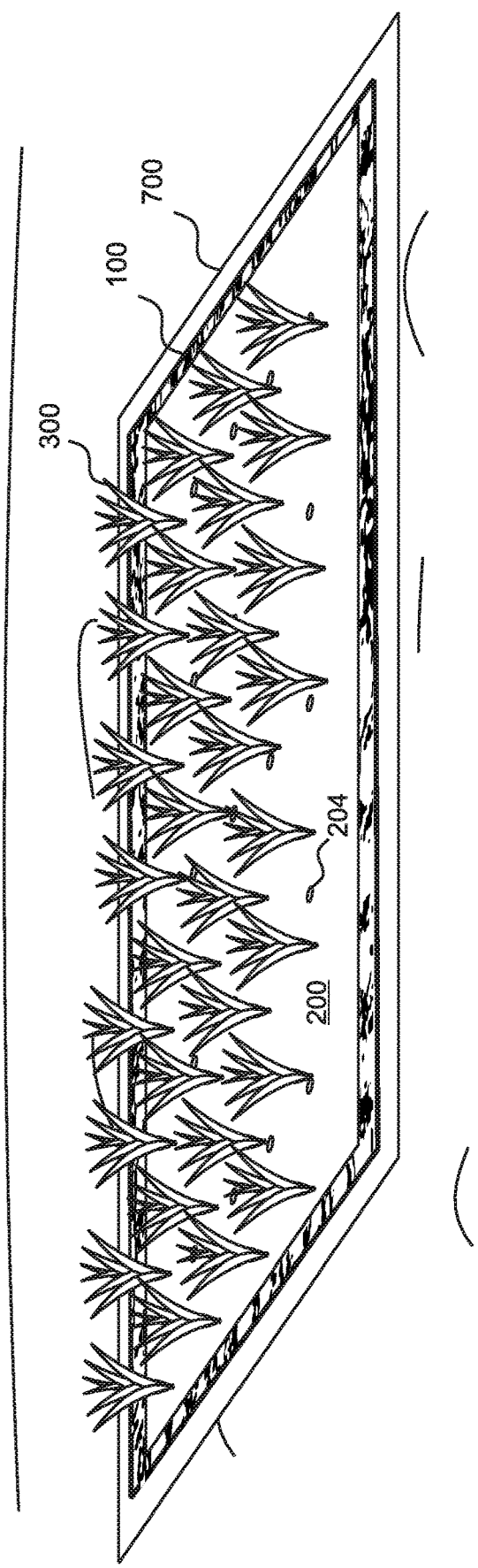
FIG. 8 is a perspective view of the embodiment of FIG. 7 shown after the vegetation has sprouted and broken through the transparent cover.

FIG. 3-5 are directed to an embodiment in which the vegetation 300 is initially sprouted and rooted in the mat 100 under controlled conditions, before the mat is placed at the arid location 400. In other embodiments, the vegetation 300 is allowed to germinate and take root in the mat 100 at the arid location. FIG. 7 is a perspective view of an embodiment in which the vegetation 300 is provided as seeds in the mat 100, and a perforated, frangible, biodegradable cover sheet 200 is placed directed on top of the mat 100. In this embodiment, the seeds germinate and take root at the arid location 400, initially lifting the cover sheet 200 as they group upward, and eventually breaking through the frangible cover sheet 200, as shown in FIG. 8.

The embodiment of FIGS. 7 and 8 further includes a water barrier 700 placed below the mat 100 which prevents any water that is not retained by the mat 100 and SAP from reaching the underlying soil or sand 400. This feature can be especially helpful in sandy locations where any moisture that reaches the underlying sand will be quickly absorbed and lost. The water barrier 700 can be a plastic sheet, and can be cellulosic or otherwise biodegradable.

Figure 9:
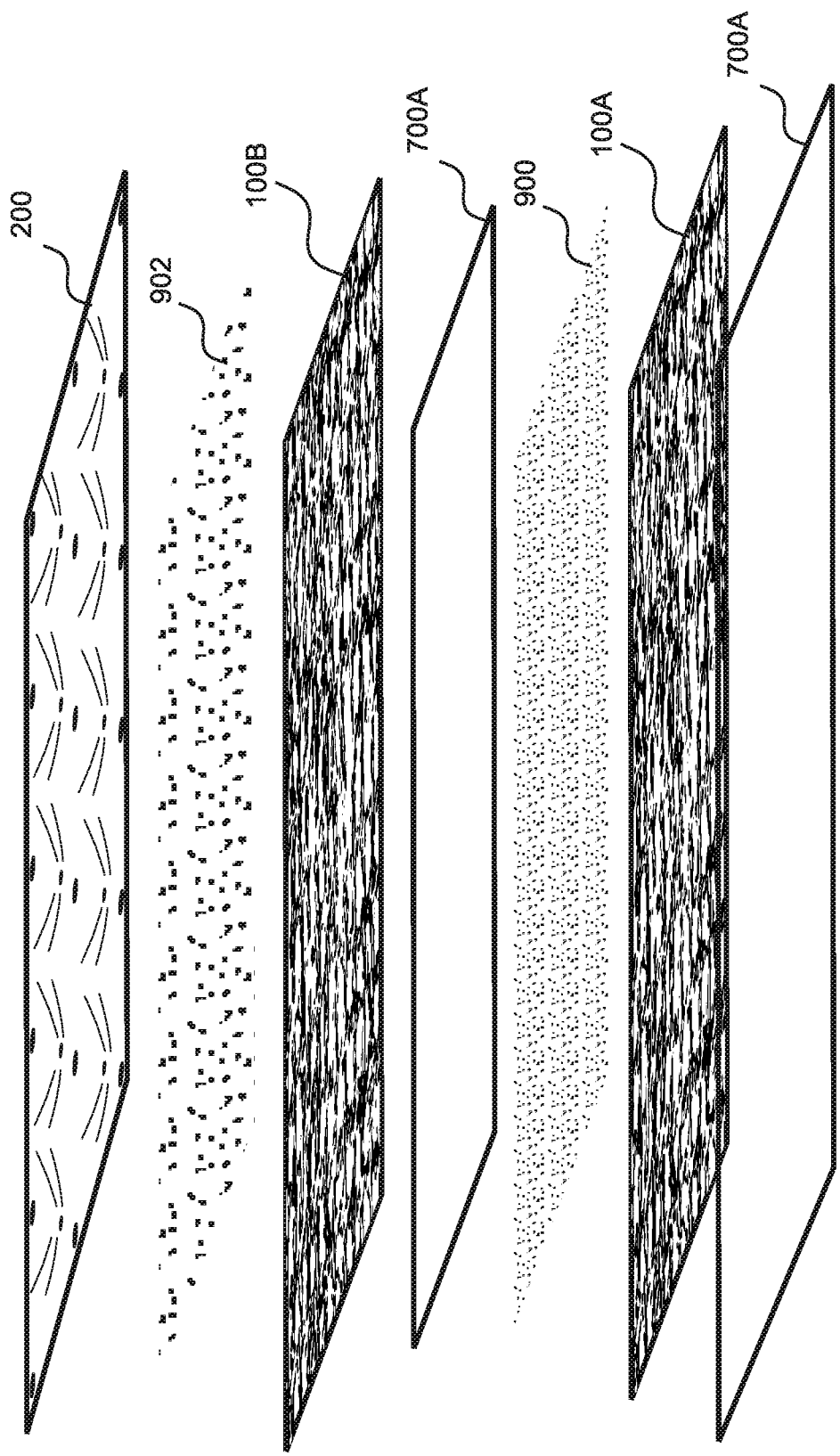
Figure 10:
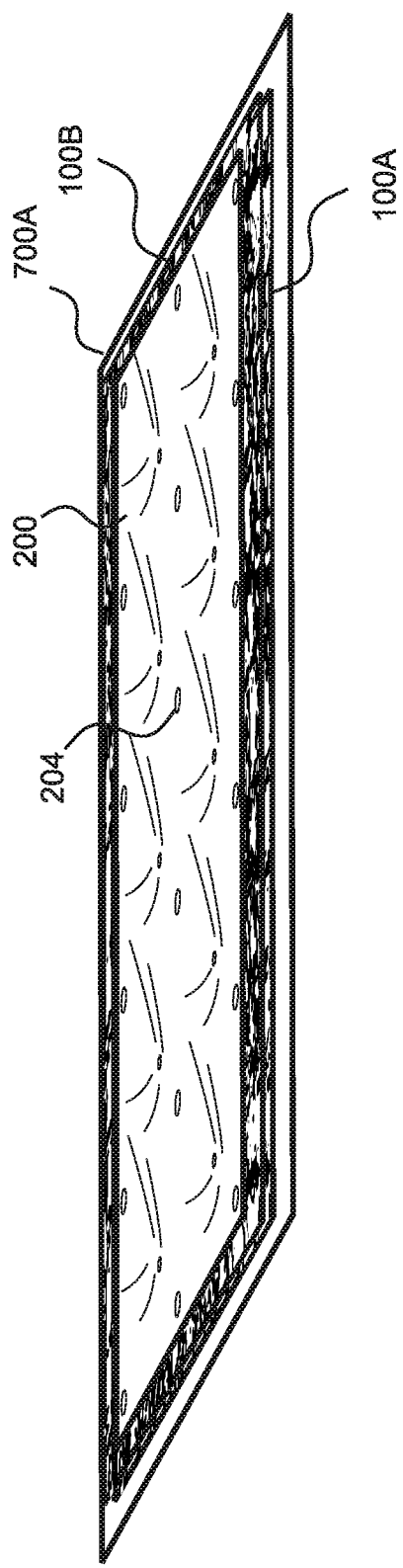
FIG. 10 is a perspective view of the assembled embodiment of FIG. 9.

Embodiments of the present invention include a plurality of mats stacked on top of each other, with SAP and/or seeds are located between the mats. FIGS. 9 and 10 illustrate an embodiment that includes two biodegradable mats 100A, 100B stacked on top of each other, where FIG. 9 is an exploded view and FIG. 10 is an assembled view. In the embodiment of FIGS. 9 and 10, a layer of seeds mixed with SAP 900 is provided between the mats 100A, 100B, and an additional layer of SAP 902 is provided on top of the upper mat 100B.

A water barrier 700A is provided below the mats 100A, 100B, and in addition a second, frangible water barrier 700B is provided between the mats 100A, 100B. This second water barrier 700B is smaller in size than the mats 100A, 100B, so that the mats 100A, 100B make direct contact with each other around their perimeters. This allows moisture from rain, dew, etc. that is absorbed by the upper mat 100B to be wicked into the lower mat 100A, so that the seeds 900 can germinate. In similar embodiments, a perforated sheet is included between the mats 110A, 100B.

In the embodiment of FIG. 9, the seeds 900 germinating between mats 100A, 100B thereby experience an environment that is similar to seeds that are planted below ground, which do not encounter sunlight until they have sprouted and grown upward through the soil. Once the seeds have germinated and broken through the second water barrier 700A, they grow through the upper mat 100B and come into contact with the upper layer of SAP 902, which provides an additional source of water as the vegetation 300 continues to grow and extends into the sunlight.

Figure 11:
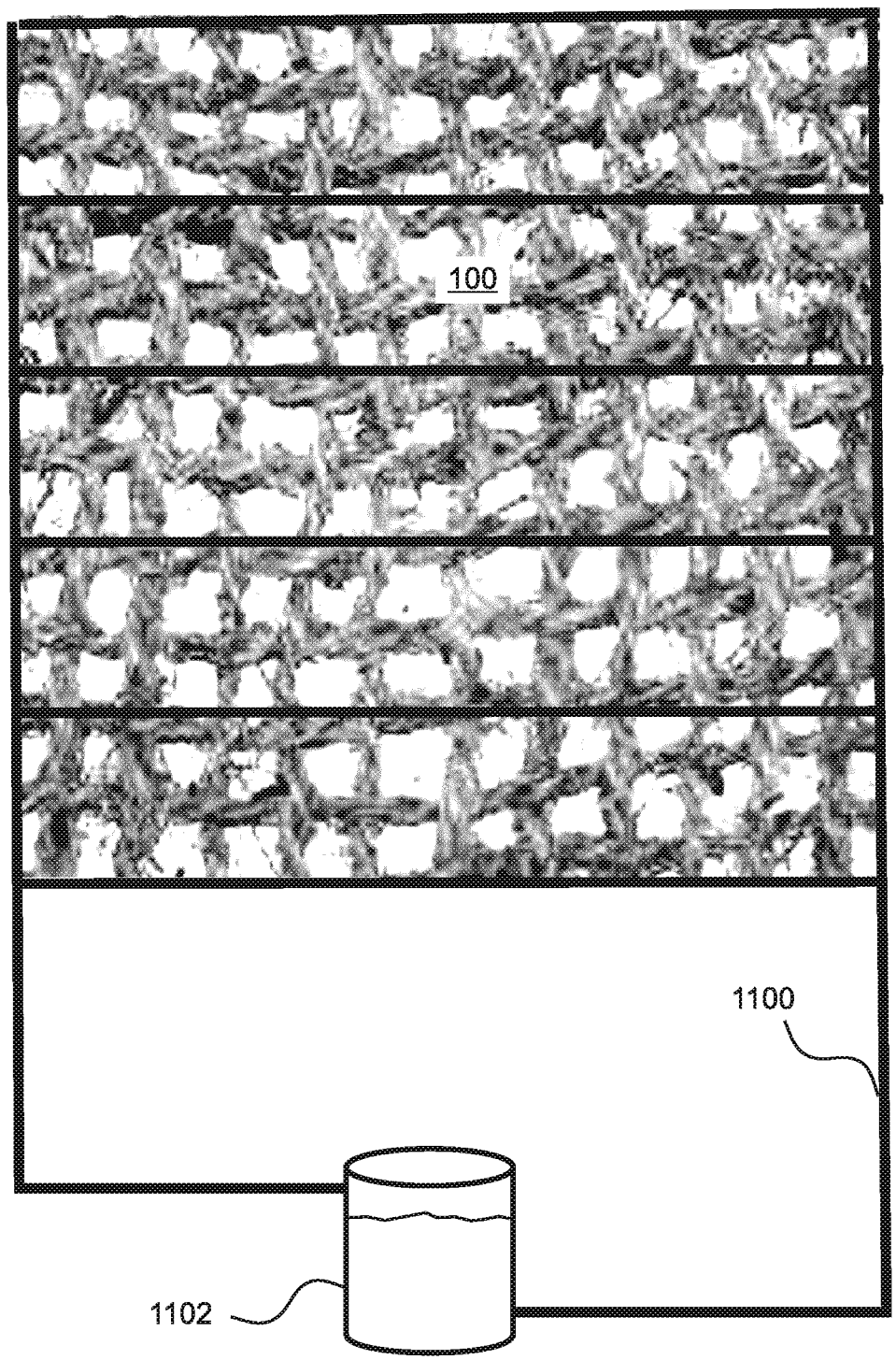
FIG. 11 is a top view of a mat that includes a water distribution system according to an embodiment of the invention.
Figure 12:
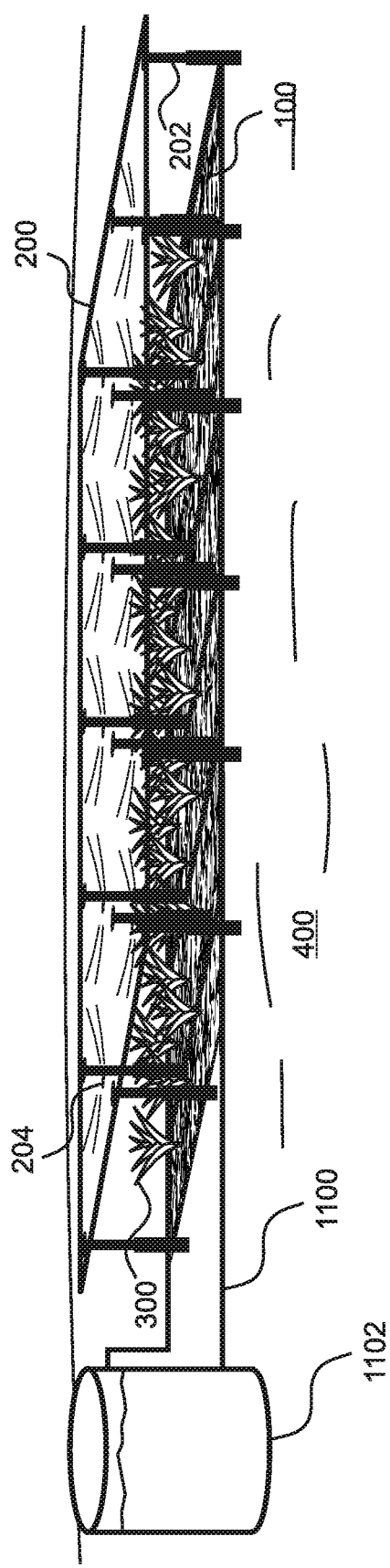
FIG. 12 is a perspective view of an embodiment similar to FIG. 5 but including the water distribution system of FIG. 11.

In the second general aspect of the invention, vegetation 300 is cultivated that requires continued watering, shade, and/or other support, such that the mat(s) 100, cover sheet(s) 200 and/or other components are not necessarily biodegradable. With reference to FIG. 11, in some of these embodiments an irrigation system 1100 is included with the mat 100, and is configured to deliver water on an on-going basis to the mat (or mats) 100 from an external water reservoir 1102. In some of these embodiments, the mat (or mats) 100 is/are made from a material that naturally wicks the provided water throughout the mat 100, ensuring that the SAP and the vegetation 300 is uniformly wetted. FIG. 12 is a perspective view of an embodiment similar to FIG. 5 that includes an irrigation system and reservoir for ongoing cultivation of plants that are not naturally adapted to arid environments. In such cases, even when long term care of the vegetation 300 is required, the apparatus and method of the present invention serve to minimize the time, effort and resources, including quantity of water, that are required.

Figure 13:
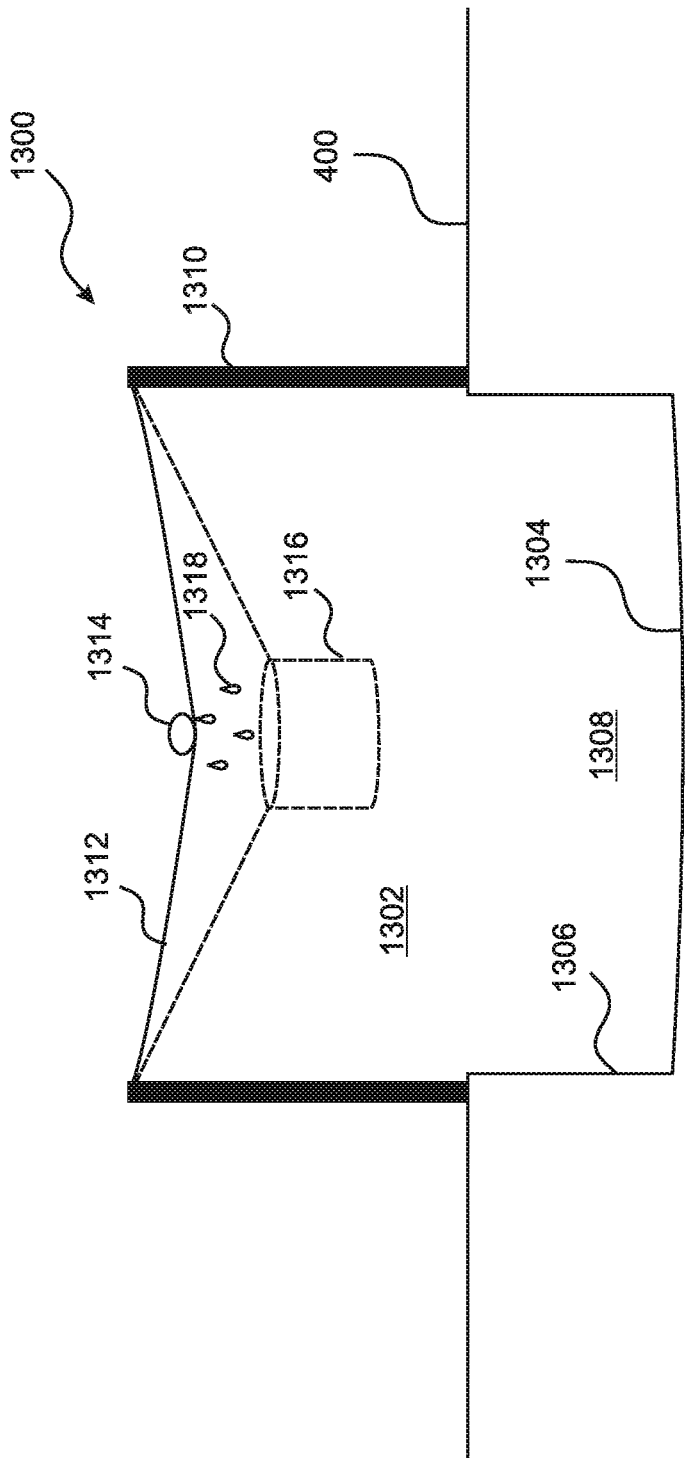
FIG. 13 is a cross-sectional side view of a solar still.

In similar embodiments, the water reservoir 1102 of FIGS. 11 and 12 is augmented or replaced by one or more "solar stills." FIG. 13 is a cross-sectional view of a typical solar still 1300. In general, a solar still 1300 comprises a well 1302 that is bounded on the bottom 1304 and/or sides 1306 by surrounding soil or sand 400 that contains some amount of water. The example of FIG. 13 the well 1302 includes a hole or depression 1308 made in the ground 400 as well as a well-head 1310 that extends the well 1302 above ground level. Other embodiments include only the well head 1310 or only the hole 1308.

The well 1302 is covered by a transparent material such as a plastic sheet 1312 which allows light to enter the well 1302, but traps moisture within the well 1302. The transparent cover 1312 is not flat, but instead slopes downward toward a depression in the center that defines a "lowest point" of the cover 1312, and is generally centered above the well 1302. In the example of FIG. 13, this is accomplished simply by using a flexible sheet of plastic as the cover 1312 and placing a stone 1314 in the center. A water collection vessel 1316 is suspended in the well directly below the "lowest point" of the cover 1312.

Accordingly, sunlight enters the well 1302 through the transparent cover 1312 and heats the interior of the well according to the "greenhouse" effect. As a result, the soil immediately adjacent to the well is elevated in temperature, causing any moisture contained in the surrounding sand or soil 400 to evaporate and to fill the well 1302 with water vapor. Because the transparent cover 1312 is in contact with the surrounding air, it remains near ambient temperature, and therefore is lower in temperature than the air and water vapor within the well 1312. As a result, the water vapor condenses on the underside of the transparent cover 1312, flows toward the low point in the center of the cover 1312, and drops into the collection vessel 1316 as water drops 1318.

Figure 14:
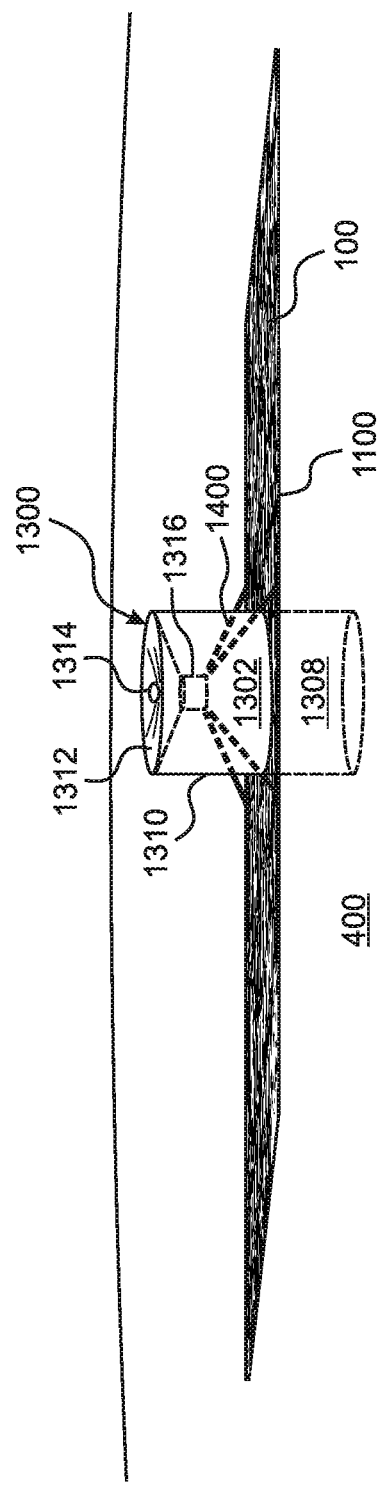
FIG. 14 is a perspective view showing the solar still of FIG. 13 installed in the center of the mat of FIG. 11 and supplying water to the irrigation system in place of the FIG. 11 water reservoir, where the transparent cover has been omitted from the figure for clarity of illustration.

FIG. 14 is a perspective view that illustrates the solar still 1300 of FIG. 13 installed in the center of a mat 100 in an embodiment of the invention. Water conduits 1400 are included through which water collected by the receptacle 1316 flows into an irrigation tubing system 1100 that distributes the collected water throughout the mat 100. For clarity of illustration, the transparent cover sheet 200 has been omitted from FIG. 14. Features that would normally not be visible because they are within the well head 1310 or under the ground 400 are shown in dashed lines.

Figure 15:
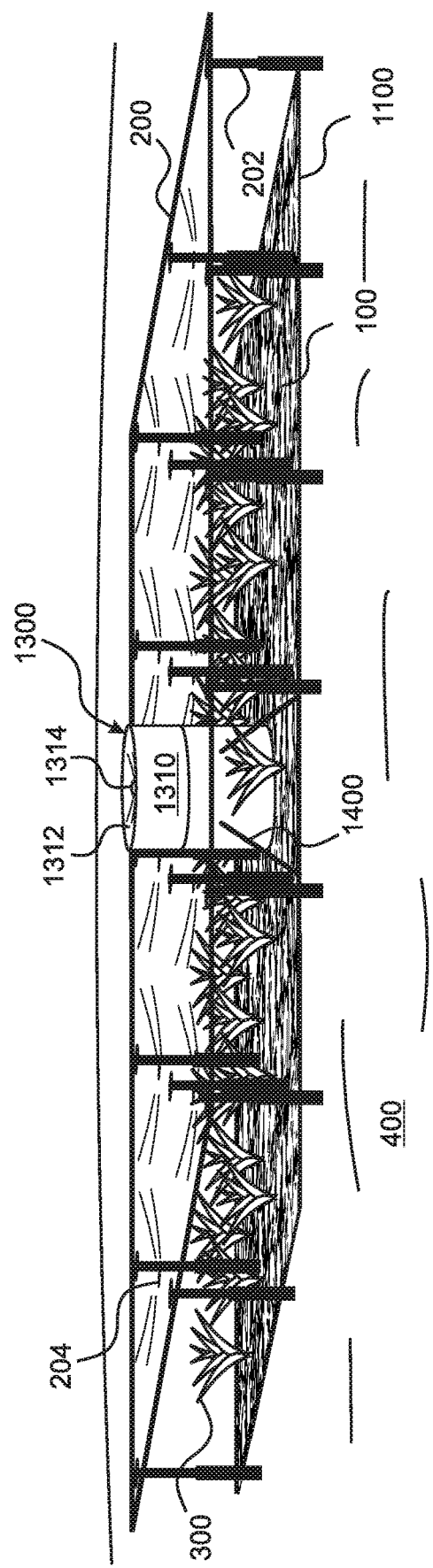
FIG. 15 is a perspective view of the mat, irrigation system, and solar still of FIG. 14 shown with the transparent cover and surrounding vegetation included in the figure.

FIG. 15 is a perspective view of an embodiment similar to FIG. 5 but including the solar still 1300 and irrigation system 1100 of FIG. 14. Only the visible components of the solar still 1300 are shown. In the embodiment of FIG. 15, the well head 1310 is tall enough to cause the still 1300 to extend through and above the transparent cover sheet 200. In similar embodiments, the still 1300 is covered by the transparent cover sheet 200.

In embodiments, the cover 1312 of the still 1300 is removable. In some of these embodiments, waste vegetation, such as fresh clippings or other fresh vegetative waste resulting from cultivation of the vegetation 300 in the mat 100, is placed into the well 1302 of the still 1300, such that any moisture contained in the waste vegetation is extracted by the still 1300 and recycled to the cultivated vegetation 300. Once all water has been extracted from the waste vegetation, the dried remains can be removed and discarded or distributed to the vegetation 300 as a compost or fertilizer. In some embodiments, the dried waste vegetation remains allowed to remain in the well 1302 to form a water-absorbent organic soil that tends to attract and hold moisture from the surrounding soil or sand, thereby improving the efficiency of the solar still 1300.

It should be noted that, while the embodiments of FIGS. 14 and 15 include only one solar still 1300, similar embodiments include a plurality of solar stills distributed at locations throughout the mat 100. It should also be noted that, in embodiments, the solar still(s) can be made from biodegradable materials, similar to the stakes 202, transparent cover 200, and other components of the invention.

Figure 16:
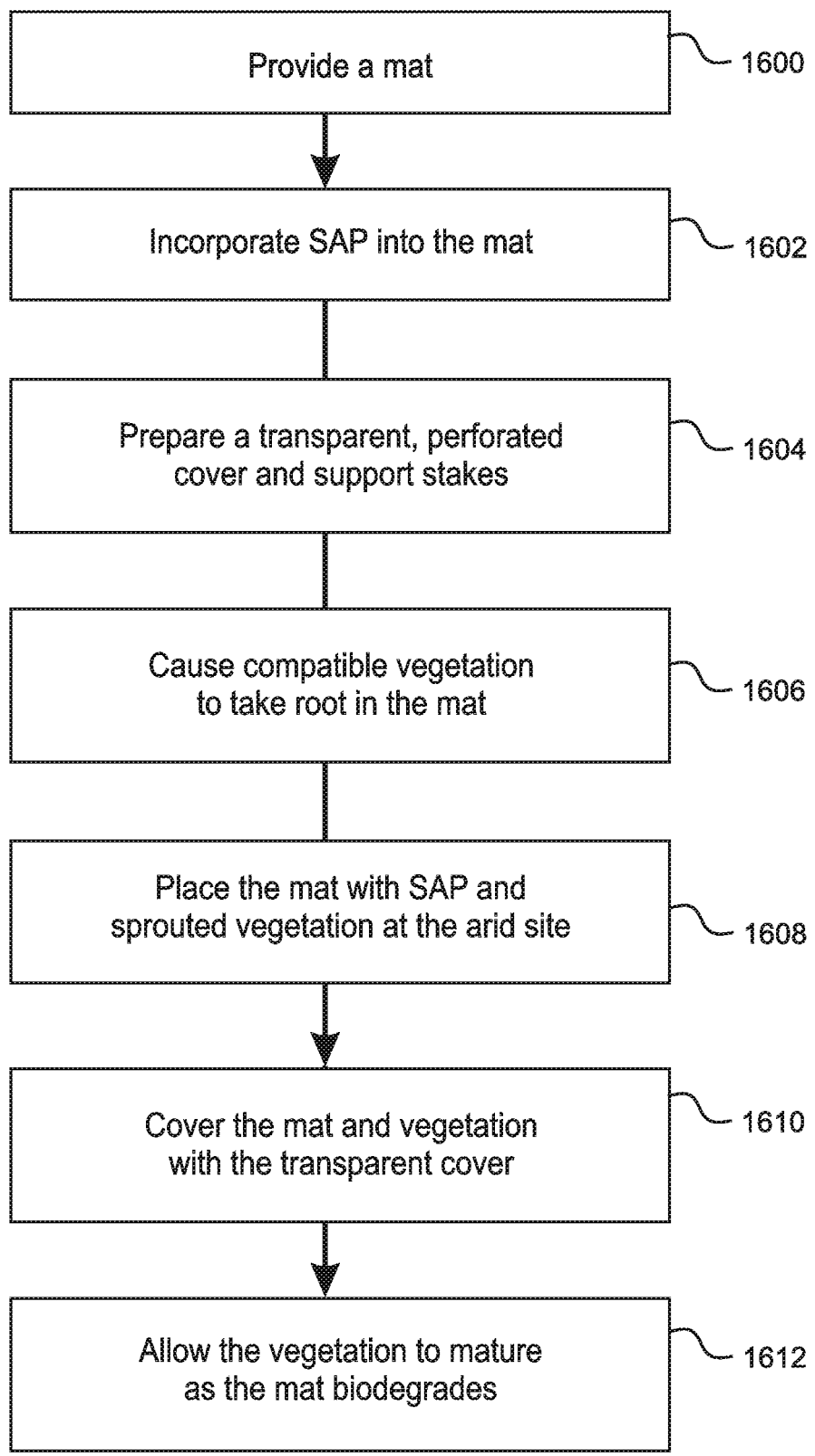
FIG. 16 is a flow diagram illustrating the steps of an embodiment of the method of the present invention.

FIG. 16 is a flow diagram that illustrates steps included in embodiments of the present invention. A mat 100 is prepared 1600, and an SAP is incorporated 1602 into the mat 100. In embodiments of the first general aspect, the mat 200 is biodegradable, and can include coir. In some embodiments of the first general aspect, the SAP is also biodegradable. In embodiments, sand, soil, and/or fertilizer are also included with the mat 100. Any sand or soil that is included can be similar to sand or soil naturally found at the arid location 400. A transparent or semi-transparent, perforated cover sheet 200 is also prepared 1604. Embodiments further include a supporting structure such as support stakes 202. In some embodiments of the first general aspect, the cover sheet 200 and/or stakes 202 are also biodegradable.

One or more varieties of vegetation 300 are selected, and are caused to sprout and take root 1606 in the biodegradable mat 100. In the embodiment of FIG. 16, this takes place under controlled conditions before the mat is transferred to the arid location 400. In other embodiments, the vegetation 300 is caused to sprout and take root in the mat at the arid location 400. Once the young vegetation 300 is established in the mat 100, in the embodiment of FIG. 16 the mat together with the SAP and rooted vegetation 300 is placed 1608 at the arid location 400, and is covered 1610 by the perforated, transparent cover 200 supported by the stakes 202 or other support structure, so as to allow sunlight in, as well as precipitation (through the perforations 204), while trapping most of the water vapor that is evaporated from the ground 400 and/or the mat 100.

Finally, the vegetation 300 is allowed to mature and take root 1616 in the underlying sand/soil 400. In the first general aspect, the mat 100 eventually biodegrades. In some embodiments of the first general aspect, the transparent cover 200 and stakes 202 or other support structure are physically removed once the vegetation 300 is established, while in other embodiments of the first general aspect, some or all of the transparent cover 200 and/or stakes 202 and other support structure are biodegradable, and need not be removed once the mat 100 and cover 200 are placed at the arid location 400. In similar embodiments of the second general aspect, the transparent cover 200 and stakes 202 or other support structure remain in place throughout the cultivation period of the vegetation 300.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for cultivating vegetation at an arid location, the method comprising:
   providing a mat;
   providing a super-absorbent polymer ("SAP") cooperative with the mat; selecting a variety of vegetation to be grown at the arid location; causing immature plants of the selected variety to take root in the mat; placing the mat with rooted vegetation at the arid location; and covering the mat and rooted vegetation with a cover made from a transparent or semi-transparent material, said cover being supported above the mat by a support structure comprising a plurality of stakes that support the cover at spaced-apart locations;
   said cover forming a physical barrier configured to cause water vapor beneath the cover to condense on an underside of the cover and drop onto the mat;
   said cover being perforated at locations that are spaced apart from the support locations of the stakes, thereby allowing rain that falls onto the cover to drain through the perforations and be absorbed by the SAP that is cooperative with the mat.

2. The method of claim 1, further comprising incorporating fertilizer into the mat.

3. The method of claim 1, further comprising including sand or soil with the mat.

4. The method of claim 3, wherein the sand or soil is similar to sand or soil that is present at the arid location.

5. The method of claim 1, wherein the steps of placing the mat at the arid location and covering the mat with the transparent or semi-transparent cover occur before the step of causing the immature plants to take root in the mat.

6. The method of claim 1, wherein the steps of placing the mat at the arid location and covering the mat with the transparent or semi-transparent cover occur after the step of causing the immature plants to take root in the mat.

7. The method of claim 1, wherein the cover is biodegradable.

8. The method of claim 1, further comprising removing the cover from the arid location after the vegetation has become established at the arid location.

9. The method of claim 1, wherein the support structure is biodegradable.

10. The method of claim 1, further comprising removing the support structure from the arid location after the vegetation has become established at the arid location.

11. The method of claim 1, further comprising placing a water barrier at the arid location below the mat.

12. The method of claim 11, wherein the water barrier is biodegradable.

13. The method of claim 1, further comprising:
providing a water distribution system cooperative with the mat; and
providing water to the vegetation during the cultivation thereof via the water distribution system.

14. The method of claim 13, wherein the water distribution system includes a water reservoir.

15. The method of claim 13, wherein the water distribution system includes at least one solar still.

16. The method of claim 15, further comprises placing waste vegetation in the solar still so that moisture is extracted from the waste vegetation and distributed to the vegetation that is rooted in the mat.

17. The method of claim 1, wherein the mat is a woven mat.

18. An apparatus for cultivating vegetation at an arid location, the apparatus comprising:
a mat;
a super-absorbent polymer ("SAP") cooperative with the mat; seeds or immature vegetation incorporated or rooted in the mat; and a perforated cover made from a transparent or semi-transparent material covering the mat and covering the vegetation rooted in the mat;
a support structure comprising a plurality of stakes configured to support the cover above the mat at spaced-apart support locations of the stakes;
said cover forming a physical barrier configured to cause water vapor beneath the cover to condense on an underside of the cover and drop onto the mat;
said cover being perforated at locations that are spaced apart from the support locations, thereby allowing rain that falls onto the cover to drain through the perforations and be absorbed by the SAP that is cooperative with the mat rain that falls onto the cover to drain through the perforations and be absorbed by the SAP that is cooperative with the mat.

19. The apparatus of claim 18, wherein the mat is biodegradable.

20. The apparatus of claim 19, wherein the biodegradable mat includes coir.

21. The apparatus of claim 18, wherein the vegetation is compatible with the arid location.

22. The apparatus of claim 18, further comprising fertilizer included in the mat.

23. The apparatus of claim 18, further comprising at least one of sand and soil included with the mat.

24. The apparatus of claim 23, wherein the included sand or soil is similar in appearance to sand or soil that is indigenous to the arid location.

25. The apparatus of claim 18, wherein the SAP is biodegradable.

26. The apparatus of claim 25, wherein the SAP is a cellulose-based or starch-based polymer.

27. The apparatus of claim 18, wherein the cover is biodegradable.

28. The apparatus of claim 18, wherein the support structure is biodegradable.

29. The apparatus of claim 18, wherein the mat is included in a stack of mats.

30. The apparatus of claim 29, further comprising a water barrier included between a pair of adjacent mats in the stack of mats.

31. The apparatus of claim 18, further comprising a water distribution system cooperative with the mat.

32. The apparatus of claim 31, wherein the water distribution includes a water reservoir.

33. The apparatus of claim 31, wherein the water distribution system includes a solar still.

34. The apparatus of claim 18, wherein the mat is a woven mat.

* * * * *